United States Patent [19]
Ono et al.

[11] Patent Number: 4,777,083
[45] Date of Patent: Oct. 11, 1988

[54] CARBON ARTICLE COMPRISING PIECES OF CARBONACEOUS MATERIAL BONDED WITH ONE ANOTHER AND PROCESS FOR PRODUCING THE SAME

[75] Inventors: Takashi Ono; Naohiro Murayama, both of Iwaki, Japan

[73] Assignee: Kureha Kagaku Kogyo Kabushiki Kaisha, Tokyo, Japan

[21] Appl. No.: 812,724

[22] Filed: Dec. 23, 1985

[30] Foreign Application Priority Data

Dec. 27, 1984 [JP] Japan ................ 59-280898

[51] Int. Cl.$^4$ .................................... B32B 31/20
[52] U.S. Cl. ........................ 428/218; 156/89; 156/242; 428/408; 429/40; 429/44; 429/209
[58] Field of Search .................... 156/89, 242, 245; 428/408, 218; 429/40, 41, 42, 43, 44, 45, 36, 209

[56] References Cited
U.S. PATENT DOCUMENTS

| 4,166,145 | 8/1979 | Hatch et al. ................ 428/283 |
| 4,279,952 | 7/1981 | Kodama et al. ............. 156/89 |
| 4,400,433 | 8/1983 | Ishiguro et al. ............. 428/408 |
| 4,522,895 | 6/1985 | Shigeta et al. .............. 429/44 |
| 4,567,086 | 1/1986 | Fukuda et al. .............. 428/408 |

FOREIGN PATENT DOCUMENTS

| 230334 | 12/1963 | Austria . |
| 1049588 | 11/1966 | United Kingdom . |
| 1223080 | 2/1971 | United Kingdom . |
| 1312929 | 4/1973 | United Kingdom . |
| 1527146 | 10/1978 | United Kingdom . |
| 1588876 | 4/1981 | United Kingdom . |
| 2068922 | 8/1981 | United Kingdom . |

Primary Examiner—Caleb Weston
Attorney, Agent, or Firm—Cushman, Darby & Cushman

[57] ABSTRACT

Disclosed herein are an integrated carbon article of a large size having a bulk density of more than 1.01 g/cm$^3$, comprising pieces of carbonaceous material(s) of the same or different quality and flexible graphite sheet(s) produced by interposing the flexible graphite sheet(s) between each of the pieces of carbonaceous material(s), bonding each of the pieces of carbonaceous material(s) and the flexible graphite sheet(s) with an adhesive agent and calcining the thus bonded material at a temperature of not lower than 800° C.

17 Claims, 1 Drawing Sheet

F I G. (1)
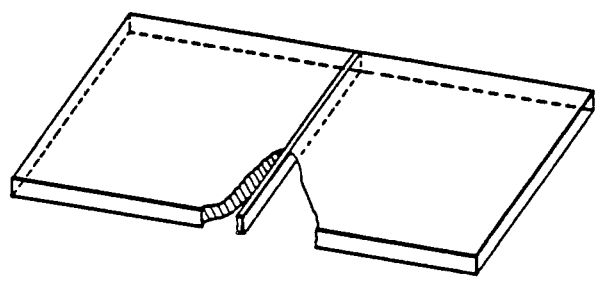
F I G. (2)
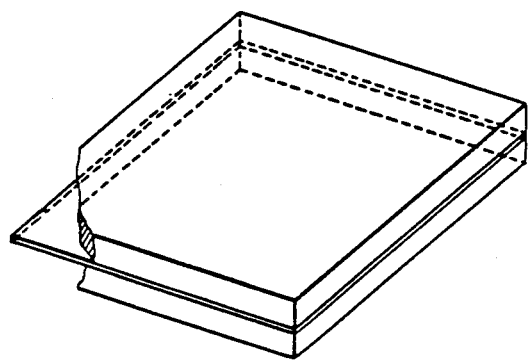

CARBON ARTICLE COMPRISING PIECES OF CARBONACEOUS MATERIAL BONDED WITH ONE ANOTHER AND PROCESS FOR PRODUCING THE SAME

BACKGROUND OF THE INVENTION

The present invention relates to a carbon article produced from the carbonaceous materials, and particularly to a large-size carbon article produced by calcining the mutually bonded pieces of carbonaceous material(s) and the method for bonding the pieces of carbonaceous material(s). More in detail, the present invention relates to an integrated carbon article of a large size having a bulk density of more than 1.01 g/cm$^3$, produced by bonding pieces of carbonaceous material(s) of the same or different quality and flexible graphite sheet(s) interposed between each of the pieces of carbonaceous material(s), with an adhesive agent, and calcining the thus bonded material at a temperature of not lower than 800° C., thereby integrating the thus bonded materials into a carbon article, the method for producing the same and the method for bonding the pieces of the large-size carbonaceous material(s).

In recent years, the carbon articles essentially consisting of the carbonaceous materials such as carbon fibers and carbon particles have been used in various industrial fields such as electrodes for a fuel cell and an electrolyser, and with the development of technology and the increase of demands, the requirements for the improvements of productivity and physical properties thereof have been increased more and more.

Although the carbonaceous materials are excellent in the physical properties, for instance, corrosion resistance, electro-conductivity, mechanical strength, etc. as the material, for utilizing these excellent physical properties more effectively, the study and development of carbon article produced by calcining composite carbonaceous materials obtained by bonding the carbonaceous materials of the same quality or the different quality has been conducted.

Such a carbon article has been hitherto produced by adhering a plurality of carbonaceous materials to each other with an adhesive agent and calcining and carbonizing the thus adhered composite carbonaceous materials. However, in the case of producing the composite carbonaceous material according to the just-mentioned process, there are cases where the carbonaceous materials once adhered together are separated from one other at the adhered surfaces thereof during the calcination due to the difference between the rates of expansion and contraction of the carbonaceous materials and those of the adhesive agent, and cases where cracks are formed in the thus produced carbon article, thus resulting frequently in the reduction of productive yield.

In addition, the demands for supplying the carbon articles of a relatively large size and/or of a complicated shape have been increased in recent years from the structural and functional view points, and in such cases, the problems of the above-mentioned separation (exfoliation) and formation of cracks become serious, particularly in the production steps.

As has been stated, the following strict demands have been imposed on the final products (the carbon articles). (1) Exfoliation of the once bonded pieces of carbonaceous material does not occur. (2) Cracks are not formed in the final product. (3) The final product retains the excellent specificities originally possessed by the carbonaceous material itself such as mechanical strength and electrical specificities. Namely, the production of the final product (the carbon articles) has been attended with much difficulty.

In consideration of the above-mentioned situations, the present inventors have studied for finding out the method of bonding the pieces of carbonaceous materials to each other to form the composite carbonaceous materials, and as a result of their studies, it has been found out that in the case of interposing flexible graphite sheet(s) obtained by compressing the expanded graphite particles, between the each piece of carbonaceous materials, bonding each of the pieces of the carbonaceous materials and the flexible graphite sheet with an adhesive agent and calcining the thus bonded material, the carbon article of the favorable specificities particularly for an electrode used in a fuel cell or in an electrolyser can be produced with a desirable productivity by the action of the flexible graphite sheet as the buffering layer of the carbonaceous materials having difference in the rates of thermal expansion and contraction between each of the pieces of carbonaceous materials, and the present invention has been attained based on the finding.

Namely, the object of the present invention is to provide a process for producing an integrated carbon article, particularly of a large size, which does not show the abovementioned demerits of the conventional technology for producing the carbon articles. In addition, another object of the present invention is to provide an integrated carbon article of a large size and of excellent specificities, produced by the above-mentioned process.

SUMMARY OF THE INVENTION

In a first aspect of the present invention, there is provided an integrated carbon article of a large size having a bulk density of more than 1.01 g/cm$^3$, produced by interposing flexible graphite sheet(s) prepared by compressing expanded graphite particles, between each of pieces of carbonaceous materials of the same or different quality, bonding the pieces of carbonaceous materials and the flexible graphite sheet(s) with an adhesive agent and calcining the thus bonded material at a temperature of not lower than 800° C., thereby obtaining the integrated carbon article.

In a second aspect of the present invention, there is provided a process for producing an integrated carbon article of a large size having a bulk density of more than 1.01 g/cm$^3$, comprising interposing flexible graphite sheet(s) prepared by compressing expanded graphite particles, between each of pieces of carbonaceous materials having a bulk density of at least 1.01 g/cm$^3$ in the case of calcining thereof at a temperature of not lower than 800° C., bonding the pieces of carbonaceous materials and the flexible graphite sheet(s) with an adhesive agent and calcining the thus bonded material at a temperature of not lower than 800° C., thereby obtaining the integrated carbon article.

In a third aspect of the present invention, there is provided a process for uniting pieces of carbonaceous materials of a large size, comprising interposing the flexible graphite sheet(s) prepared by compressing expanded graphite particles, between each of the pieces of carbonaceous materials having a bulk density of at least 1.01 g/cm$^3$ in the case of calcining thereof at a temperature of not lower than 800° C., and bonding the pieces of carbonaceous materials, thereby obtaining a composite carbonaceous material.

BRIEF EXPLANATION OF DRAWINGS

Of the attached drawings, FIG. 1 and FIG. 2 are those schematically explaining the modes of bonding the two pieces of carbonaceous material and the flexible graphite sheet prepared in Examples and Comparative Example.

DETAILED EXPLANATION OF THE INVENTION

The object of the present invention has been accomplished by uniting a plurality of pieces of carbonaceous material(s) of a large size via flexible graphite sheet(s) therebetween, the flexible graphite sheet(s) obtained by compressing expanded graphite particles, by using an adhesive agent.

The term "a large size" used herein means that the length of the longest side of the piece of carbonaceous material(s) used as the starting material or of the carbon articles as the final product is not smaller than 100 mm. Also, the process according to the present invention is applicable to the piece of carbonaceous material(s) used as the starting material of which the length of the longest side is smaller than 100 mm.

The carbon article of a large size according to the present invention is produced by the process comprising the steps of (1) interposing a flexible graphite sheet(s) prepared by compressing the expanded graphite particles between each of the pieces of carbonaceous material(s) of the same or different in quality, (2) bonding the pieces of carbonaceous material(s) and the flexible graphite sheet(s) via an adhesive agent by applying an adhesive agent on the surfaces of the flexible graphite sheet and/or the surfaces of each of the pieces of carbonaceous material(s) and (3) calcining the thus bonded material at a temperature of not lower than 800° C. The thus produced article has been integrated into a wholly carbonized body having a bulk density of more than 1.01 g/cm$^3$.

The flexible graphite sheet used according to the present invention has been prepared by compressing the expanded graphite particles obtained by (a) treating the graphite particles of not more than 5 mm in diameter with an acid and (b) heating the thus treated graphite particles, and the thus obtained sheet having (1) not more than 1 mm in thickness, (2) from 1.0 to 1.5 g/cm$^3$ in bulk density, (3) not more than $0.35 \times 10^{-2}$ cm$^2$/kg in compression distortion (the distortion rate under the compression load of 1 kg/cm$^2$) and (4) a preferable flexibility not to be broken until it is bent to 10 mm in radius of curvature is preferable.

As a favorable example of the commercialized flexible graphite sheets, GRAFOIL ® made by U.C.C. may be exemplified.

The pieces of carbonaceous materials bonded together according to the present invention may be mutually the same or different in their physical properties.

The pieces of carbonaceous material(s) used as the starting material of the carbon articles according to the present invention has a bulk density of at least 1.01 g/cm$^3$ in the case of calcining thereof at a temperature of not lower than 800° C., and may be exemplified below, however, they are not limited to those shown below.

① The pieces of carbonaceous starting material prepared by molding a mixture of carbon aggregate such as carbon fibers which have been calcined at a temperature of not lower than 800° C. and a binder selected from the group consisting of phenol resins, furan resins and epoxy resins.

The carbon fibers used herein are preferably from 5 to 30 μm in diameter and from 0.05 to 2 mm in length. In the case where the length of the carbon fibers is over 2 mm, they are interwound mutually to form hair balls in the steps to molding resulting in the difficulty of obtaining the desired bulk density, the desired distribution of micropores and the uniformity of the physical properties. In addition, in the case where the length is below 0.05 mm, it is impossible to obtain the carbonaceous material provided with the necessitated mechanical strength.

The linear contraction rate in carbonization of the carbon filter at a temperature of 2000° C. is in a range of 0 to 3.0%, and in the case where the rate of linear contraction is over 3.0%, there is a possibility that such a large linear contraction rate becomes one of the causes of generating exfoliation in the step of calcination.

In the case of calcining the thus obtained carbonaceous starting material at a temperature of not lower than 800° C., a bulk density of the thus calcined product is not less than 1.01 g/cm$^3$.

② The pieces of carbon material prepared by molding a mixture of carbon aggregate selected from the group consisting of carbon fibers, carbon particles and oxidized pitch particles, and one or more binders selected from the group consisting of, for example, phenol resins, furan resins, epoxy resins, petroleum pitches and coal pitches, and further calcining the thus molded mixture at a temperature of not lower than 800° C.

A bulk density of the thus obtained carbon material is not less than 1.3 g/cm$^3$.

③ The graphitic material prepared by molding a mixture of aggregate comprising graphite particles and/or easily-graphitizable carbon particles with an easily-graphitizable binder, for example, coal pitch and calcining the thus molded mixture at a temperature of not lower than 2000° C.

A bulk density of the thus obtained graphitic material is not less than 1.5 g/cm$^3$.

According to the present invention, the above-mentioned pieces of carbonaceous materials are used in an optional combination of, for instance, ①+①, ①+②, ①+③, ②+②, ②+③ and ③+③, however, it is the indispensable condition in the combination that the linear contraction rate in the case of calcining the combined pieces of carbonaceous materials at 2,000° C. is not more than 3%.

As the adhesive agent used for adhering the above-mentioned pieces of carbonaceous material to the above-mentioned flexible graphite sheet, any adhesive agent usually used for bonding the carbonaceous materials together may be suitable, however, it is particularly preferable to use the adhesive agent prepared by dissolving from 40 to 100 parts by weight of a phenol resin in 100 parts by weight of a solvent selected from the group consisting of methanol, ethanol, acetone and methyl ethyl ketone, or another adhesive agent prepared by further adding from 30 to 100 parts by weight of carbon particles of not more than 200 μm in diameter to the above-mentioned adhesive agent and mixing them. Although the thickness of the layer of the adhesive agent interposed between each of the pieces of carbonaceous materials and the flexible graphite sheet is not particularly limited, it is preferably not more than 0.5 mm in thickness.

In addition, the bonding of the pieces of carbonaceous materials and the flexible graphite sheet(s) may be carried out by pressing at a temperature of 100° to 180° C. under a pressure of 0.5 to 50 kg/cm$^2$ for 5 to 120 min.

The carbon article obtained according to the present invention shows the excellent specificities originally possessed by the carbonaceous materials and at the same time, does not cause any exfoliation nor formation of cracks on the adhered surfaces of mutual carbonaceous materials in the production thereof, and be prepared in a favorable production yield as will be seen in the examples and comparative examples, because the flexible graphite sheet interposing between the each piece of carbonaceous materials acts as a buffer to the thermal expansion or contraction of the mutual carbonaceous materials in the step of heating treatment thereof. Such excellent effects of the present invention is clearly seen in the comparison to the case where the uniting is effected by the adhesive agent only.

In addition, by virtue of the above-mentioned efficacy, according to the process of the present invention, it is possible to prepare the articles of a large size, for instance, those of not less than about 100 mm in length of the longest side and those having a complicated shape without causing any problems of exfoliation and cracks of the thus produced articles.

The shape of the pieces of carbonaceous materials used as the starting material of the carbon articles according to the present invention may be freely selected as far as the piece of carbonaceous material has a surface to be adhered. The surface of the piece of carbonaceous material may be also curved such as a side-wall of a cylinder and the like to be adhered.

Further, the shape of the pieces of carbonaceous materials is entirely free, for instance, a sheet, a plate, a board, a cube, a disk, a cylinder, etc.

The longest side of the piece of carbonaceous materials having a shape of the disk, the cylinder and the like means a diameter of the round surface (the base) thereof, a height or a thickness thereof, and preferably, the length thereof is also not less than 100 mm.

The carbon article according to the present invention is preferably used in preparing an electrode for a fuel cell or an electrolyser.

The present invention will be explained more in detail while referring to the following non-limitative examples and comparative examples.

EXAMPLE 1

After preparing three kinds of square plates of 150 mm in a side and 20 mm in thickness which were named ①, ② and ③ from each of the three kinds of carbonaceous materials shown below, six kinds of integrated carbon articles were prepared in the mode of uniting the two square plates in combination of ①+①, ①+②, ①+③, ②+②, ②+③ and ③+③ via a flexible graphite sheet (GRAFOIL ®) by using an adhesive agent and calcining the thus united materials at a temperature of 2000° C. The number of each kind of carbon articles thus prepared was ten, and the results of the preparation are shown in Table 1 and the number of the articles which showed a favorable bonding property is also shown in Table 1. FIGS. 1 and 2 show the thus prepared carbon articles, and the articles shown in FIG. 1 have the adhered surface of 150 mm×20 mm in size, and the articles shown in FIG. 2 have the adhered surface of 150 mm×150 mm in size.

The three kinds of carbonaceous materials, the flexible graphite sheet and the adhesive agent used in Example 1 were as follows:
(1) The carbonaceous materials:
(1)-① The carbonaceous starting material:

After blending the short carbon fibers (made by KUREHA KAGAKU KOGYO KABUSHIKI KAISHA, the trade name of M-204S, 14 $\mu$m in the average diameter and 400 $\mu$m in the average length) and a phenol resin (made by ASAHI-YUKIZAI Co., Ltd., the trade name of RM-210, the resol type) in the weight ratio of 70:30, the mixture was molded in a metal mold at a temperature of 130° C., under a molding pressure of 50 kg/cm$^2$ for 20 minutes to prepare the carbonaceous starting material. In the case of calcining the thus obtained carbonaceous starting material at 850° C., a bulk density of the thus calcined product was 1.05 g/cm$^3$.
(1)-② The carbon material:

After blending the oxidized pitch particles (made by KUREHA KAGAKU KOGYO KABUSHIKI KAISHA, the trade name of MH-P, 5 micrometers in the average particle diameter) which had been calcined preliminarily in an atmosphere of gaseous nitrogen at 850° C. and the phenol resin (the same as shown in (1)-① in the weight ratio of 65:35, the mixture was molded in a metal mold at a temperature of 140° C., under a molding pressure of 100 kg/cm$^2$ for 30 min and the thus molded material was heated in an electric furnace to 2000° C. at a rising rate of 50° C./min and then calcined for 60 min at the temperature to prepare the carbon material. A bulk density of the thus obtained carbon material was 1.6 g/cm$^3$.
(1)-③ graphitic material:

A commercialized graphitic material (made by TOYO Carbon Co., Ltd., the trade name of A-280, a bulk density of 1.7 g/cm$^3$).
(2) The flexible graphite sheet:

A commercialized flexible graphite sheet (made by UCC under the registered trade name of GRAFOIL ®, 0.25 mm in thickness, 1.2 g/cm$^3$ in bulk density, 0.1×10$^{-2}$ cm$^2$/kg in rate of compression distortion and 8 mm in radius of curvature at break) was used for the purpose.
(3) The adhesive agent:

In 100 parts by weight of methyl ethyl ketone, 80 parts by weight of the phenol resin mentioned in (1)-① were dissolved at a room temperature to prepare the adhesive agent for the purpose. (4) The uniting condition After applying the above-mentioned adhesive agent on each surfaces to be adhered, of each pieces of the above-mentioned carbonaceous materials ①, ② and ③, the each pair of the pieces of carbonaceous material and the flexible graphite sheet were united with the adhesive at a temperature of 130° C., under a uniting pressure of 5 kg/cm$^2$ for 30 min, and the thus united composite material was calcined at 2000° C. to obtain the carbon article according to the present invention as the product.

The result of the production of the carbon articles are shown in Table 1.

TABLE 1

| Combination of Carbonaceous material | Result (the united state) | |
|---|---|---|
| | Surface (150 mm × 150 mm) | Surface (150 mm × 20 mm) |
| ① + ① | good* in all 10 pieces | good in all 10 pieces |
| ① + ② | the same as above | the same as above |
| ① + ③ | the same as above | the same as above |
| ② + ② | the same as above | the same as above |
| ② + ③ | the same as above | the same as above |
| ③ + ③ | the same as above | the same as above |

Note:
*"good" means that no exfoliation nor any crack was observed by naked eyes on the united part after calcination at 2000° C.

As are seen in Table 1, it has been confirmed that the two pieces of carbonaceous materials of the same or different quality were favorably united under the present uniting conditions by making the flexible graphite sheet interpose between the two pieces of carbonaceous materials.

COMPARATIVE EXAMPLE

In the same manner as in Example 1 except for not interposing the flexible graphite sheet between the two pieces of carbonaceous material(s), a series of the composite carbonaceous articles were prepared, the results being shown in Table 2.

TABLE 2

| Combination of Carbonaceous Materials | Result (the number of articles with the good uniting state in 10 pieces of product) | |
|---|---|---|
| | Surface (150 mm × 150 mm) | Surface (150 mm × 20 mm) |
| ① + ① | 5 pieces | 8 pieces |
| ① + ② | 0 | 0 |
| ② + ③ | 0 | 0 |
| ③ + ③ | 0 | 0 |

As are seen in Table 2, in the cases where flexible graphite sheet was not used between the two pieces of carbonaceous materials, the articles with the good united state were narrowly obtained when the both carbonaceous materials containing preliminarily together the resin as the binder therein were united, but the articles wherein either of the two pieces of the carbonaceous materials did not contain the resin as the binder therein showed defects in all cases.

EXAMPLE 2

In the same manner as in Example 1 except for using the pieces of carbonaceous materials which are different only in the dimension (shown in Table 3), the carbon articles were produced in a mode of adhering the surfaces having the largest dimension together as the mode shown in FIG. 2, the results being shown in Table 3.

TABLE 3

| Combination of Carbonaceous materials | Results (percentage of the articles with good uniting property (%)) Dimension of adhered surface of carbonaceous material | | | |
|---|---|---|---|---|
| | 150 mm square | 300 mm square | 500 mm square | 700 mm square |
| ① + ① | 100% | 100% | 100% | 100% |
| ① + ② | 100% | 100% | 100% | 90% |
| ① + ③ | 100% | 100% | 100% | 90% |
| ② + ② | 100% | 100% | 90% | 70% |
| ② + ③ | 100% | 100% | 90% | 70% |
| ③ + ③ | 100% | 100% | 90% | 70% |

As are seen in Table 3, the percentage of the occurrence of the articles with favorable uniting property decreases as the dimension of the pieces of carbonaceous materials becomes larger, however, in comparison of the case in Comparative Examples wherein flexible graphite sheet was not used, the percentage of the occurrence of the articles having favorable uniting property was as high as 70% even in the cases where the size of the pieces of carbonaceous material was as large as 700 mm square.

What is claimed is:

1. A process for producing an integrated carbon article of a large size, said article having
    (i) a bulk density of more than 1.01 g/cm$^3$, and
    (ii) a longest side of a length of at least 100 mm, said process comprising the steps of:
    (1) interposing a flexible graphite sheet between pieces of carbonaceous material of the same or different quality, said flexible graphite sheet having a thickness of not more than 1 mm, a bulk density of 1.0 to 1.5 g/cm$^3$, a distortion rate of not more than $0.35 \times 10^{-2}$ cm$^2$/kg under a compression load of 1 kg/cm$^2$ and a flexibility such that said flexible graphite sheet does not break when bent to a radius of curvature of 10 mm,
    (2) bonding the pieces of carbonaceous material and the flexible graphite sheet(s) with an adhesive agent, and
    (3) calcining the thus bonded material at a temperature of at least 800° C. so that the integrated carbon article is obtained, the linear contraction rate in the case of calcining the bonded pieces of carbonaceous material at 2000° C. being not more than 3%,
    each of said pieces of carbonaceous material being selected from the group consisting of
        (a) pieces of carbonaceous starting material produced by molding a mixture of a carbon aggregate calcined at a temperature of at least 800° C. and a binder, which pieces of carbonaceous material have a bulk density of at least 1.01 g/cm$^3$ after calcination thereof at a temperature of at least 800° C.,
        (b) pieces of carbon material produced by molding a mixture of a carbon aggregate and a binder so that a molded material is formed and calcining the molded material at a temperature of at least 800° C., which pieces of carbon material have a bulk density of at least 1.3 g/cm$^3$, and
        (c) graphitic material produced by molding a mixture of an aggregate of graphite articles and/or easily graphitizable carbon particles and a binder so that a molded material is formed and calcining the molded material at a temperature of at least 2000° C., which graphitic material has a bulk density of at least 1.5 g/cm$^3$.

2. The process according to claim 1, wherein said carbon aggregate in item (a) is carbon fiber.

3. The process according to claim 1, wherein said carbon aggregate in item (b) is selected from the group consisting of carbon fibers, carbon particles, and oxidized pitch particles.

4. The process according to claim 1, wherein said binder in the item (a) is selected from the group consisting of phenol resins, furan resins and epoxy resins.

5. The process according to claim 1, wherein said binder in the item (b) is selected from the group consisting of phenol resins, furan resins, epoxy resins, petroleum pitch, and coal pitch.

6. The process according to claim 1, wherein said binder in item (c) is coal pitch.

7. The process according to claim 1, wherein said flexible graphite sheet is produced by the process comprising the steps of acid-treating graphite particles of not more than 5 mm in diameter, heating the thus treated graphite particles so that said graphite particles are expanded and compressing said expanded graphite particles.

8. The process according to claim 1, wherein said adhesive agent is a solution comprising 40 to 100 parts by weight of a phenol resin in 100 parts by weight of a solvent selected from the group consisting of methanol, ethanol, acetone and methyl ethyl ketone, wherein the thickness of a layer of said adhesive agent in the bonded material is not more than 0.5 mm.

9. The process according to claim 8 wherein said solution further comprises 30 to 100 parts by weight of carbon particles of not more than 200 μm in diameter.

10. The process according to claim 1, wherein said bonding comprises pressing said pieces of carbonaceous material and said flexible graphite sheet(s) at a temperature of 100° to 180° C. under a pressure of 0.5 to 50 kg/cm$^2$ for 5 to 120 minutes.

11. The process according to claim 1, wherein said carbonaceous material is selected from the group consisting of said carbon material in item (b) and said graphitic material in the item (c).

12. A process for bonding pieces of carbonaceous material of a large size and of the same or different quality, comprising the steps of:
(1) interposing a flexible graphite sheet between each of said pieces of carbonaceous material, which flexible graphite sheet is prepared by compressing expanded graphite particles and has a thickness of not more than 1 mm, a bulk density of 1.0 to 1.5 g/cm$^3$, a distortion rate of not more than $0.35 \times 10^{-2}$ cm$^2$/kg under a compression load of 1 kg/cm$^2$ and a flexibility such that said flexible graphite sheet does not break when bent to a radius of curvature of 10 mm, and
(2) bonding said pieces of carbonaceous material and said flexible graphite sheet with an adhesive agent at a temperature of 100° to 180° C. under a pressure of 0.5 to 50 kg/cm$^2$ for 5 to 120 minutes,
each of said pieces of carbonaceous material being selected from the group consisting of
(a) pieces of carbonaceous starting material produced by molding a mixture of a carbon aggregate calcined at a temperature of at least 800° C. and a binder, which pieces of carbonaceous material have a bulk density of at least 1.01 g/cm$^3$ after calcination at a temperature of at least 800° C.,
(b) pieces of carbon material having a bulk density of at least 1.3 g/cm$^3$, produced by molding a mixture of a carbon aggregate and a binder so that a molded material is formed and calcining the molded material at a temperature of at least 800° C., and
(c) graphitic material having a bulk density of at least 1.5 g/cm$^3$, produced by molding a mixture of an aggregate of graphite particles and/or easily graphitizable carbon particles and a binder so that a molded material is formed and calcining the molded material at a temperature of at least 2000° C.

13. An integrated dense carbon article of a large size having (i) a bulk density of more than 1.01 g/cm$^3$, and (ii) a longest side of a length of at least 100 mm, comprising pieces of carbonaceous material of the same or different quality and a flexible graphite sheet interposed between each of said pieces of carbonaceous material, said carbon article being integrated into a wholly carbonized body by bonding said piece of carbonaceous material and said graphite sheet with an adhesive agent and calcining at a temperature of at least 800° C.,
wherein said pieces of carbonaceous material are calcined carbonaceous material having a bulk density of at least 1.01 g/cm$^3$.

14. The integrated dense carbon article according to claim 13, wherein said carbonaceous material is a calcined carbon material having a bulk density of at least 1.3 g/cm$^3$.

15. The integrated dense carbon article according to claim 13, wherein said carbonaceous material is a calcined graphite material having a bulk density of at least 1.5 g/cm$^3$.

16. The integrated dense carbon article according to claim 13, wherein
(1) said flexible graphite sheet is prepared by
  (i) acid-treating graphite particles of at least 5 mm in diameter,
  (ii) heating the treated graphite particles so that said graphite particles are expanded, and
  (iii) compressing the expanded graphite particles, wherein said flexible graphite sheet has a thickness of not more than 1 mm, a bulk density of 1.0 to 1.5 g/cm$^3$, a distortion rate of not more than $0.35 \times 10^{-2}$ cm$^2$/kg under a compression load of 1 kg/cm$^2$ and a flexibility such that said flexible graphite sheet does not break when bent to a radius of curvature of 10 mm,
(2) said pieces of carbonaceous material are prepared by calcining a carbonaceous material selected from the group consisting of:
  (i) pieces of carbonaceous starting material produced by molding a mixture of a carbon aggregate calcined at a temperature of at least 800° C. and a binder selected from the group consisting of phenol resins, furan resins and epoxy resins, which pieces of carbonaceous starting material have a bulk density of at least 1.01 g/cm$^3$ after calcination at a temperature of at least 800° C.,
  (ii) pieces of carbon material having a bulk density of at least 1.3 g/cm$^3$, produced by
    (a) molding a mixture of a carbon aggregate selected from the group consisting of carbon fibers, carbon particles and oxidized pitch particles, and a binder selected from the group consisting of phenol resins, furan resins, epoxy resins, petroleum pitches, and coal pitches, and
    (b) calcining the thus molded material at a temperature of at least 800° C.,
  (iii) graphitic material having a bulk density of at least 1.5 g/cm$^3$, produced by
    (a) molding a mixture of an aggregate of graphite particles and/or easily graphitizable carbon particles and an easily-graphitizable binder so that a molded material is formed and
    (b) calcining the molded material at a temperature of at least 2000° C., (3) said adhesive agent is a solution comprising 40 to 100 parts by weight of a phenol resin in 100 parts by weight of a solvent selected from the group consisting of methanol, ethanol, acetone and methyl ethyl ketone, wherein the thickness of a layer of said adhesive agent in the bonded material is not more than 0.5 mm, (4) said bonding with adhesive agent is carried out at a temperature of 100° to 180° C. under pressure of 0.5 to 50 kg/cm$^2$ for 5 to 120 minutes, and (5) a linear contraction rate in the calcination of the combined pieces of carbonaceous material at 2000° C. is not more than 3%.

17. The process according to claim 16 wherein said adhesive agent solution further comprises 30 to 100 parts by weight of carbon particles not more than 200 μm in diameter.

* * * * *